(12) United States Patent
Cartwright

(10) Patent No.: US 6,540,310 B1
(45) Date of Patent: Apr. 1, 2003

(54) GROUSER

(75) Inventor: Richard D. Cartwright, Beaverton, OR (US)

(73) Assignee: Ironwood Designs LLC, Tigard, OR (US)

( * ) Notice: Subject to any disclaimer, the term of this patent is extended or adjusted under 35 U.S.C. 154(b) by 0 days.

(21) Appl. No.: 10/132,995

(22) Filed: Apr. 26, 2002

Related U.S. Application Data

(63) Continuation-in-part of application No. 29/155,976, filed on Feb. 19, 2002.
(60) Provisional application No. 60/353,412, filed on Feb. 1, 2002.

(51) Int. Cl.$^7$ ............................................... B62D 55/28
(52) U.S. Cl. ........................ 305/180; 305/160; 305/162
(58) Field of Search ................................. 305/160, 161, 305/162, 168, 180, 51, 187, 191; 180/9.21, 9.26

(56) References Cited

U.S. PATENT DOCUMENTS

| | | | | |
|---|---|---|---|---|
| 3,561,825 A | * | 2/1971 | Gibson et al. | 305/20 |
| 4,218,101 A | * | 8/1980 | Thompson | 305/180 |
| 4,306,603 A | * | 12/1981 | Dighe et al. | 152/222 |
| 4,332,424 A | * | 6/1982 | Thompson | 305/180 |
| 4,635,740 A | | 1/1987 | Krueger et al. | |
| D298,018 S | | 10/1988 | Cartwright | |
| 4,805,968 A | | 2/1989 | Connerley | |
| 5,199,771 A | * | 4/1993 | James et al. | 305/162 |
| 5,201,574 A | * | 4/1993 | James et al. | 305/180 |
| 5,265,949 A | * | 11/1993 | Haug | 305/181 |
| 5,330,019 A | | 7/1994 | Cartwright | |
| 5,354,124 A | * | 10/1994 | James | 305/162 |
| 5,690,398 A | * | 11/1997 | Pribyl | 305/162 |
| 5,902,021 A | * | 5/1999 | Jager | 305/162 |
| 6,296,330 B1 | * | 10/2001 | Hall | 305/180 |

FOREIGN PATENT DOCUMENTS

| | | |
|---|---|---|
| WO | WO 83/03583 | 10/1983 |
| WO | WO 01/08963 | 2/2001 |

* cited by examiner

Primary Examiner—S. Joseph Morano
Assistant Examiner—Long Bac Nguyen
(74) Attorney, Agent, or Firm—Karen Dana Oster

(57) ABSTRACT

A grouser structure for use on an outer surface of a continuous track belt to provide traction and shock absorption, the grouser structure including a grouser body that defines a grouser chamber and a spline element positioned within the grouser chamber. In one preferred embodiment a shock absorption gap is formed between the inner chamber peripheral surface and the outer spline peripheral surface. In another preferred embodiment the base of the grouser body is solid or contains other structure to prevent the first body side leg and the second body side leg from spreading. In yet another preferred embodiment the spline element is a solid reinforcement spline element. In still another preferred embodiment the spline element is associated with an extension section to which an ice cleat may be functionally attached.

38 Claims, 5 Drawing Sheets

US 6,540,310 B1

GROUSER

The present application is a nonprovisional of U.S. Provisional Patent Application Ser. No. 60/353,412, filed Feb. 1, 2002, and a continuation-in-part of U.S. Design patent application Ser. No. 29/155,976, filed Feb. 19, 2002. The present application is based on and claims priority from these applications, the disclosures of which are hereby incorporated herein by reference.

BACKGROUND OF INVENTION

The present invention is directed to a grouser structure, and more specifically to a grouser structure that may be used on a continuous track belt on each side of a vehicle for traction and shock absorbing purposes.

The present application describes an improvement on U.S. Pat. No. 5,330,019, which was invented by the inventor of the present invention. The inventor drew from the years of experience in building and operating track vehicles to create the present invention.

Track vehicles, for purposes of this invention include any vehicle having a continuous crawler track belt trained over a plurality of tires, wheels, or guides (herein after referred to as "tires"), with the track belt on powered movement serving to propel the vehicle over the ground. Track vehicles may further include any vehicle having a continuous crawler track belt trained over a single tire. For exemplary purposes, however, a track vehicle may be produced by coupling a crawler track belt attachment to an all-terrain vehicle. So-called all-terrain vehicles are a popular type of vehicle used by hunters, recreational lists, rescue workers, law enforcement, military, resorts, ski areas, fireman, lineman, farmers, utility workers, and other operators who desire transport over rough roads, and terrain where roads are nonexistent. The vehicles may be relatively compact, and in the usual instance include a pair of power-driven rear tires mounted at the rear end of a motorcycle-type frame, where the operator sits on a seat with legs straddling a compartment where a motor and controls for powering the vehicle are located.

U.S. Pat. No. 5,330,019 described a vehicle that has significantly greater pulling power than a conventional all-terrain vehicle. The vehicle is supported by a track belt system with enhanced ability to travel over the ground and float rather than sink into the terrain. The vehicle is versatile, in that it can travel over soft, mushy surfaces, snow and other non-surfaced areas, as well as on pavement. The vehicle, therefore, is well suited, and provides a low cost alternative to other vehicles, for such uses as logging, firefighting, mining, spraying, ski resort use such as grooming, and uses requiring moving over bogs or soft tundra.

U.S. Pat. No. 5,330,019 also discloses the use of grouser structures on the outer surfaces of track belts. The shown construction provides excellent traction, enhanced gripping action with softer terrain, good road ability and steer ability with harder terrain surfaces, long life and low maintenance, and ease of repair and replacement of a grouser structure in the event such is needed.

One grouser structure disclosed in U.S. Pat. No. 5,330,019 is shown cross-section in FIG. 1. The grouser structure includes a plastic grouser body 18 and a spline element 19 (also referred to as a track bar or anchor plate) that may be secured by fasteners to a track belt to hold it in place. As shown, this grouser body 18, in cross-section, is A-shaped so that it has an upper passage. Alternative embodiments are A-shaped without an upper passage. Grip ridges extend along the outside of the grouser body. The base of the grouser body 18 is surfaced with alternating rib and grooves. A mounting passage extends along the interior of the grouser body 18. An access slot or opening connects the mounting passage with the exterior of the grouser body 18. Shoulders are defined on opposite sides of the mounting passage. The embodiments having an upper passage have greater yield ability and flex than embodiments not having the upper passage. The disclosed grouser body 18 has a tough, stiff wear-resistant plastic composition, made from extruded polyurethane material.

The spline element 19 secures the grouser body 18 against the outer surface of the track belt 22. The spline element 19 has an approximately T-shaped cross-section. Elongate outer flanges at opposite lateral margins in the element bear against shoulders. A center web in the spline element 19 extends through the slot. Fasteners extend downwardly through appropriate bores in this center web. The base of center web has a rib and groove surface. The outer surface of the track belt 22 has a rib and groove surface. The ribs and grooves of the center web substantially mate with the ribs and grooves in the track belt.

The plastic composition of the grouser body has sufficient yield ability to permit the shoulders to be flexed apart to enable placement of the upper portion of the spline element 19 inside mounting passage. When properly seated, the spline element 19 and grouser body 18 are drawn downwardly toward the outer surface of the track belt with fasteners. Flanges clamp against the shoulders. Positive non-slip engagement is provided by the mating of the ribs and grooves of the center web with the ribs and grooves in the track belt.

The grousers of U.S. Pat. No. 5,330,019 are arranged in a pattern of a row having a single central grouser structure alternated with a row having three grouser structures: a single central grouser structure with extension grouser structures on both sides extending outwardly from opposite ends of the central grouser structure. The extension grouser structures protrude beyond opposite lateral margins of the track belt.

PCT Patent Application WO 01/08963 A1 is directed to a grouser for a crawler chain. As this reference is in German, the following summary is based on speculation and is not an admission that this reference is relevant. This reference appears to disclose an A-shaped grouser with a closed base. In one of the embodiments, the base has a rib and groove surface that is suitable for mating with the rib and groove surface of the track belt. A screw extends from under the track belt, through the base, and into the interior of the grouser. This is a metallic grouser with no shock absorbing capability.

BRIEF SUMMARY OF THE INVENTION

The present invention is directed to a grouser structure, and more specifically to a grouser structure that may be used on a continuous track belt on each side of a vehicle for traction and shock absorbing purposes.

The present invention is directed to a grouser structure for use on an outer surface of a continuous track belt surrounding at least one tire on each side of a vehicle for traction and shock absorbing purposes. In one preferred embodiment the grouser structure includes a grouser body that defines a grouser chamber and a spline element positioned within the grouser chamber.

In one preferred embodiment, a gap is formed between the inner chamber peripheral surface and the outer spline peripheral surface. The gap would be constructed to provide shock absorption properties to the grouser structure.

In another preferred embodiment the base of the grouser body is solid or contains other structure to prevent the first body side leg and the second body side leg from spreading.

In yet another preferred embodiment the spline element is a solid reinforcement spline element.

In still another preferred embodiment the spline element is associated with an extension section to which an ice cleat may be functionally attached.

The foregoing and other objectives, features, and advantages of the invention will be more readily understood upon consideration of the following detailed description of the invention, taken in conjunction with the accompanying drawings.

DETAILED DESCRIPTION OF THE INVENTION

The present invention is directed to a grouser structure (indicated generally as 20 and specific exemplary embodiments indicated as 20a, 20b), and more specifically to a grouser structure 20 that may be used on a continuous track belt 22 trained over at least one of tire on each side of a vehicle 24 for traction and shock absorbing purposes.

Figure 2:
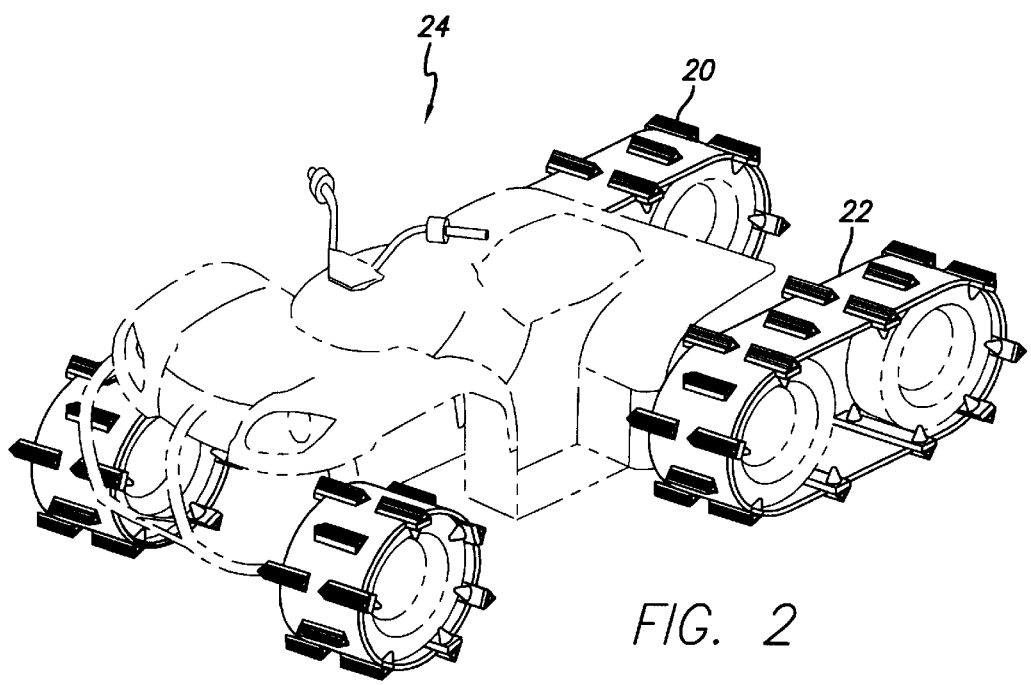
FIG. 2 is a perspective view of a vehicle incorporating exemplary grouser structures of the present invention.

As shown in FIG. 2, the grouser structures 20 of the present invention may be used on the outer surface of a track belt 22. This construction provides excellent traction, enhanced gripping action with softer terrain, good road ability and steer ability with harder terrain surfaces, long life and low maintenance in grouser structures 20 used, and ease of repair and replacement of a grouser structure 20 in the event such is needed.

Figure 3:
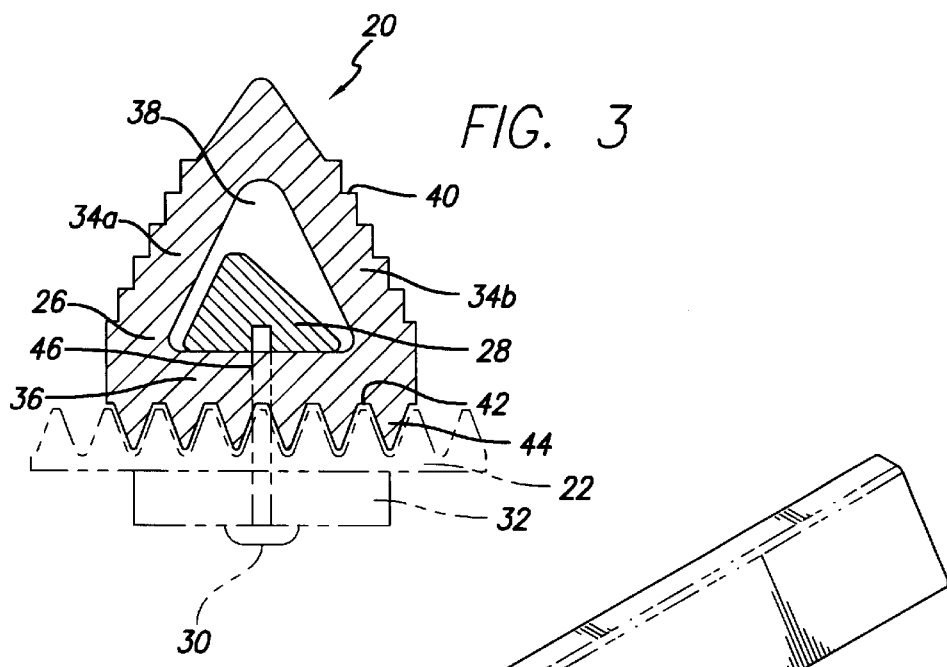
FIG. 3 is a cross-sectional view of a grouser structure having a grouser body and a spline element in which the spline element has a cross-section that is substantially the shape of a scalene, acute triangle.

As shown in FIG. 3, the grouser structure 20 of the present invention preferably includes a grouser body 26 and a spline element 28 (also referred to as a track bar or anchor plate). The grouser body 26 and spline element 28 may be secured to the track belt 22 by at least one fastener 30 to hold the grouser structure 20 in place. An optional track belt clamp 32 or other structure (including a tire guide) may be used to provide a more secure connection.

Grouser Body:

As shown, the grouser body 26 of the present invention, in cross-section, is preferably substantially triangular and has two side legs 34a, 34b and a grouser body base 36 that together enclose an internal grouser chamber 38. The side legs 34a, 34b may be, for example, straight, bowed, arced, ribbed, or stepped. Although shown as an isosceles triangle equilateral triangle (in which the side legs 34a, 34b are of the same length, but the grouser body base 36 may be a different length), the triangle may be an equilateral triangle (in which both side legs 34a, 34b and the base are of the same length) or a scalene triangle (in which the side legs 34a, 34b are of different lengths). Further the triangle may have a top point angle that is a right angle (90°) or the triangle may be acute (the angle at the top point having an angle of less than 90°) or obtuse (the angle at the top point having an angle of more than 90°). The cross-sectional shape of the grouser body 26 may be determined by the intended application. For example, more gripping or traction in a muddy terrain might be found in an equilateral triangle cross-sectional shape whereas more gripping or traction in an icy terrain might be found in a scalene triangle cross-sectional shape.

The side legs 34a, 34b preferably have a gripping structure 40 which is shown as grip ridges that extends at least partially extend along the outside of the grouser body 26. Alternative grip structure that could be substituted for the shown gripping structure 40 includes, for example, prongs/fingers, adhesive-like surface, zig-zags or other tread-like structure, or other structure that might provide gripping characteristics.

The bottom surface of the grouser body base 36 of the grouser body 26 is preferably surfaced with alternating grooves 42 and ribs 44. When positioned against the track belt 22, the bottom surface of the grouser body base 36 is in positive non-slip engagement with the grooved and ribbed surface of the track belt 22. Alternative embodiments can have a grouser body base 36 with an alternative bottom surface. At least one mounting passage 46 preferably extends through the grouser body base 36 of the grouser body 26 and provides a passage for the fasteners 30.

Figure 1:
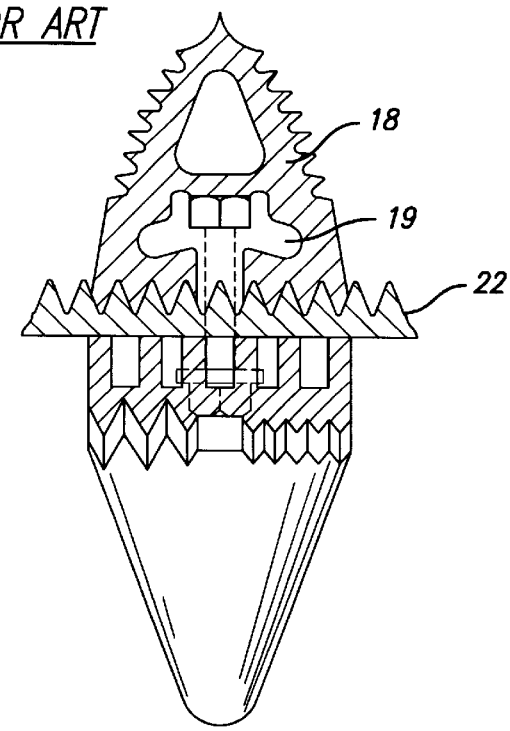
FIG. 1 is an end view of a prior art grouser structure including prior art a prior art grouser body and a prior art spline element.

It should be noted that the grouser body base 36 of the grouser body 26 is preferably substantially solid (except for the mounting passages 46). As discussed, prior out grousers such as that shown in FIG. 1 had an access slot or opening that connected an interior mounting passage (in which the spline 19 was positioned) with the exterior of the grouser body 18. The access slot had two purposes. First, it provided access to the spline 19 for fastening it to the track belt 22. Second, the grouser body 18 could be removed from the spline 19 by sliding the grouser body 18. This allowed the grouser body 18 to be replaced without removing the spline 19 from the track belt 22. The closed grouser base 36 of the present invention, however, allows greater gripping adhesion than prior art embodiments that had access slots in the grouser base. The greater gripping adhesion results from the grouser body base 36 not being spreadable. Thus the grouser body 26 cannot be torn loose from the spline element 28 as it is totally encompasses the spline element 28 which is securely fastened to the track belt 22. Further, having a solid grouser body base 36 puts more teeth in contact with the mating teeth on the surface of the track belt 22. Although it is shown as substantially solid, alternative embodiments of the grouser body 26 could have a ribbed, honeycombed, connecting straps, or other grouser body base 36 that would similarly allow greater gripping adhesion and prevent the grouser body base 36 from spreading.

The grouser body 26 of the present invention is preferably tough and substantially stiff (although some give is contemplated). The material is preferably a wear-resistant composition of plastic, polyurethane, rubber, or other suitable material. The grouser body 26 may be injection molded, extruded, cold cast, or otherwise formed. One advantage of the present invention over prior art is that the grouser body 26 can be injection molded, but the invention is not limited to this method of formation. Material density vs. spine angle is preferably relative to its intended shock absorbing characteristics.

Spline Element:

The spline element 28 (specific exemplary embodiments of which are discussed as 28a and 28b) of the present invention helps secure the grouser body 26 against the outer surface of the track belt 22. The spline element 28 has an approximately triangular cross-section. As with the grouser body 26, the sides of the spline element 28 may be straight, bowed, arced, ribbed, or stepped, but the basic shape is triangular. Although shown as a scalene triangle in FIG. 3, the triangle may be an isosceles triangle or an equilateral triangle. Further the triangle may have an angle at the top point that is a right angle or the triangle may be acute or obtuse. As with the grouser body 26, the cross-sectional shape of the spline element 28 may be determined by the intended application. Although not shown, the bottom surface of the base of the spline element 28 may have a rib and groove surface that mates with an inner rib and groove surface of the grouser body 26.

As shown, at least one fastener 30 may extend from the opposing side of the track belt 22, through the grouser body base 36, and into the base of the spline element 28. Appropriate bores may be provided in the base of the spline element 28 to accept the fastener 30. An optional track belt clamp 32 may be provided on the opposing surface of the track belt to help secure the grouser structure 20 in place. The fastener 30 may be a drill and tap structure, a nut, adhesive, or any suitable fastening mechanism. It should be noted that if the respective parts were made integral, then no fastener would be needed.

When configured, in the preferred embodiment of the present invention the spline element 28 is substantially enclosed within the grouser chamber 38 of the grouser body 26. In one preferred embodiment, the cross-sectional size of the spline element 28 is smaller than the cross-sectional size of the interior cross-sectional size of the grouser chamber 38 such that there is a clearance or gap 50 defined between at least one of the outer surfaces of the spline element sides and the corresponding inner surface of the grouser chamber 38 (the inner surface of the grouser body side legs 34a, 34b). In an alternative preferred embodiment, the angles of the spline element 28 are different from the angles of the angles of the interior of the grouser chamber 38 such that there is a gap 50 defined therebetween. In still another alternative preferred embodiment, both the sizes and the angles of the spline element 28 and the grouser chamber 38 are different such that there is a gap 50 defined therebetween. Although a gap 50 is preferred, it should be noted that the scope of the invention encompasses an embodiment in which the sizes and the angles of the spline element 28 and the grouser chamber 38 are the same such that there is not a gap 50 defined therebetween. This gap 50 significantly improves the shock absorption properties of the grouser structure 20. Specifically, the gap 50 between the grouser chamber 38 allows some flexing and bending of the grouser body 26 while the spline element 28 creates a limiting factor to how far the grouser body 26 can flex. This can be compared to the prior art embodiments that allowed no flexion and provided no shock absorption properties or that allowed over flexion that reduced desired vertical penetration and holding ability in softer terrain materials.

The shown spline element 28 is a solid reinforcement spline element 28 made of sturdy material such as metal, plastic. Although shown as a solid element, the spline element 28, depending on the material, the processes by which it is made, and its intended purpose, the spline element 28 may be hollow, honeycombed, braced, or have alternative structure suitable for its purpose.

Figure 5:
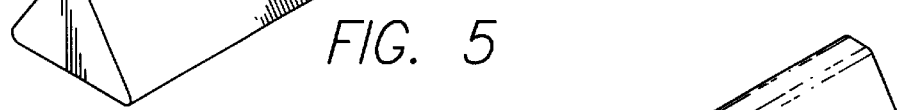
FIG. 5 is a perspective view of the first preferred embodiment of a spline element.
Figure 6:
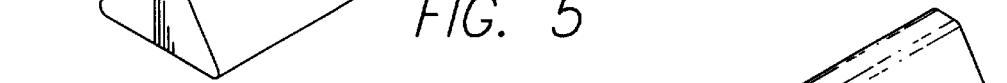
FIG. 6 is a perspective view of the second preferred embodiment of a spline element and an ice cleat.

Specific Embodiments of Grouser Structure:

FIG. 2 shows two exemplary preferred embodiments of the grouser structure 20. Specifically, the exemplary grouser structure 20a preferably includes a grouser body 26 and a spline element 28a which is shown in detail in FIG. 5 and the exemplary grouser structure 20b preferably includes a grouser body 26 and a spline element 28b which is shown in detail in FIG. 6.

In the exemplary grouser structure 20a the spline element 28a is substantially the same length as the grouser body 26 and is substantially enclosed within the grouser chamber 38. It should be noted that the dimensions shown are meant to be exemplary and are not meant to limit the scope of the invention. It should further be noted that the variations discussed above may be applied to this embodiment. For example, the gripping structure 40 may be any of those set forth above, the grouser body base 36 may be any of those set forth above, or the bottom surface of the base of the spline element 28 may have a rib and groove surface that mates with an inner rib and groove surface of the grouser body 26.

In the exemplary grouser structure 20b the spline element 28b extends beyond the grouser body 26 as an extension section 54. As shown, the extension section 54 is integral with the spline element 28b, however, in alternative embodiments the extension section 54 could be an attached section. An optional track belt clamp 32 may be used between the extension section 54 of the spline element 28b and the track belt 22. Although shown as a separate element, the track belt clamp 32 may be integral with the extension section 54. Further, although shown as having a flat mating surface, the track belt clamp 32 may have a ridged and grooved mating surface to mate with the track belt 22.

In the shown embodiment, the extension section 54 includes structure suitable for attaching an optional ice cleat 56. The removablity of the optional ice cleat 56 would be advantageous because broken and/or lost ice cleats 56 could be removed and/or replaced. In alternate embodiments, the optional ice cleat 56 could be integral with the extension section. It should be noted that the shape of the optional ice cleat 56 is meant to be exemplary and is not meant to limit the scope of the invention. For example, cylindrical, conical, pyramid-shaped, nail- or spike-shaped, or other alternative-shaped ice cleats 56 could be substituted for the embodiment shown. As with the exemplary grouser structure 20a, exemplary grouser structure 20b is shown with exemplary dimensions and variations discussed above may be applied.

The grouser structure embodiments shown in FIG. 2 are meant to be exemplary. Alternative preferred embodiments could include grouser structure that is similar to exemplary grouser structure 20a, but that is elongated to the length of the width of the track belt 22 or to extend beyond the track belt 22. Other alternative preferred embodiments could include grouser structure similar to exemplary grouser structure 20b, but having extension sections 54 on both sides of the grouser body 26. This embodiment could be positioned in rows of multiple grouser structures (spaced or unspaced), centrally positioned on the track belt 22, extending the width of the track belt 22, or extending beyond the track belt 22. Other variations of the grouser structure embodiments are contemplated within the scope of the invention.

Figure 4:
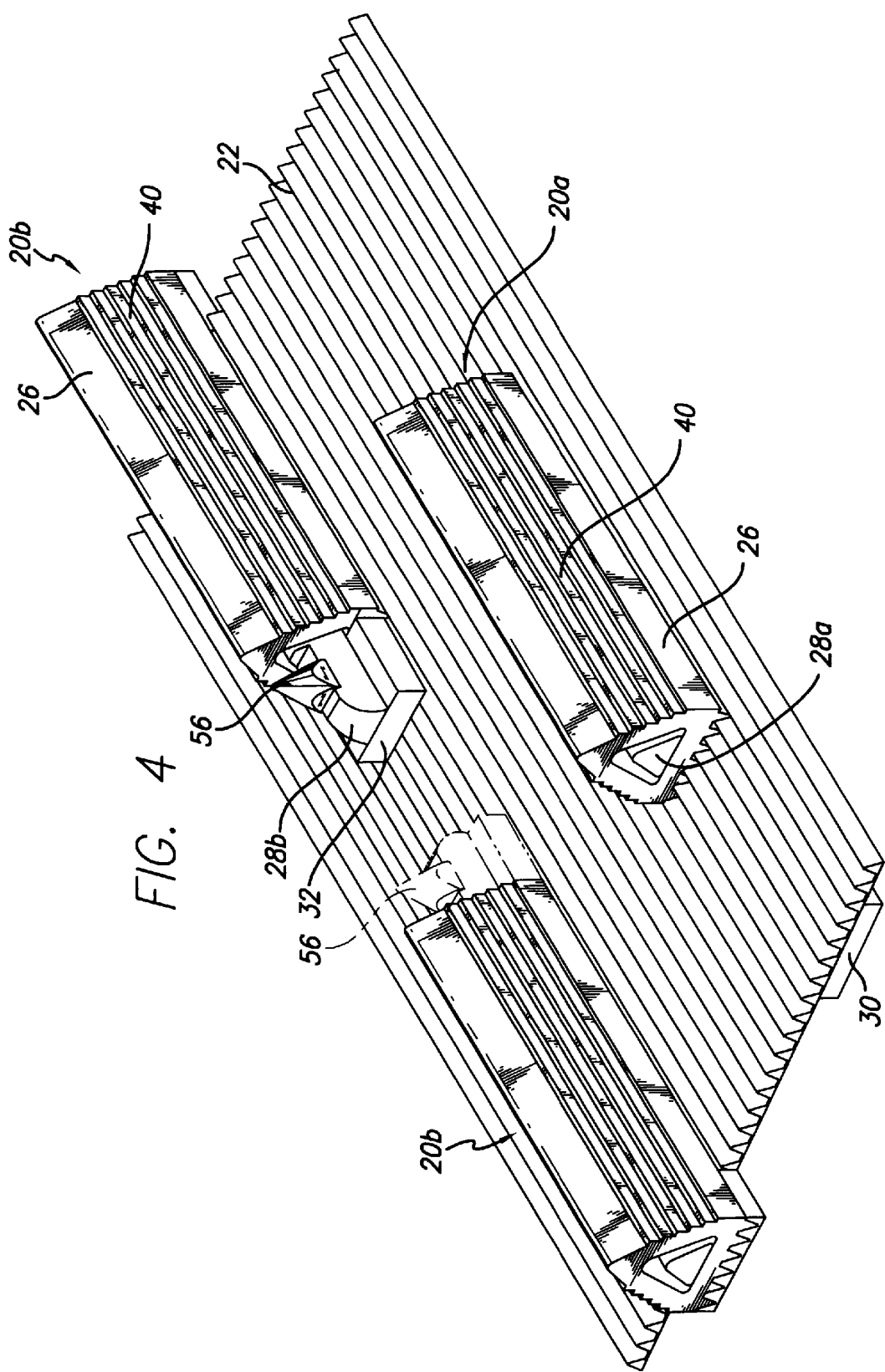
FIG. 4 is a detailed perspective view of a track belt section having a row with a single central grouser structure with a first preferred embodiment of a spline element and a row with a plurality of spaced grouser structures each with a second preferred embodiment of a spline element.
Figure 7:
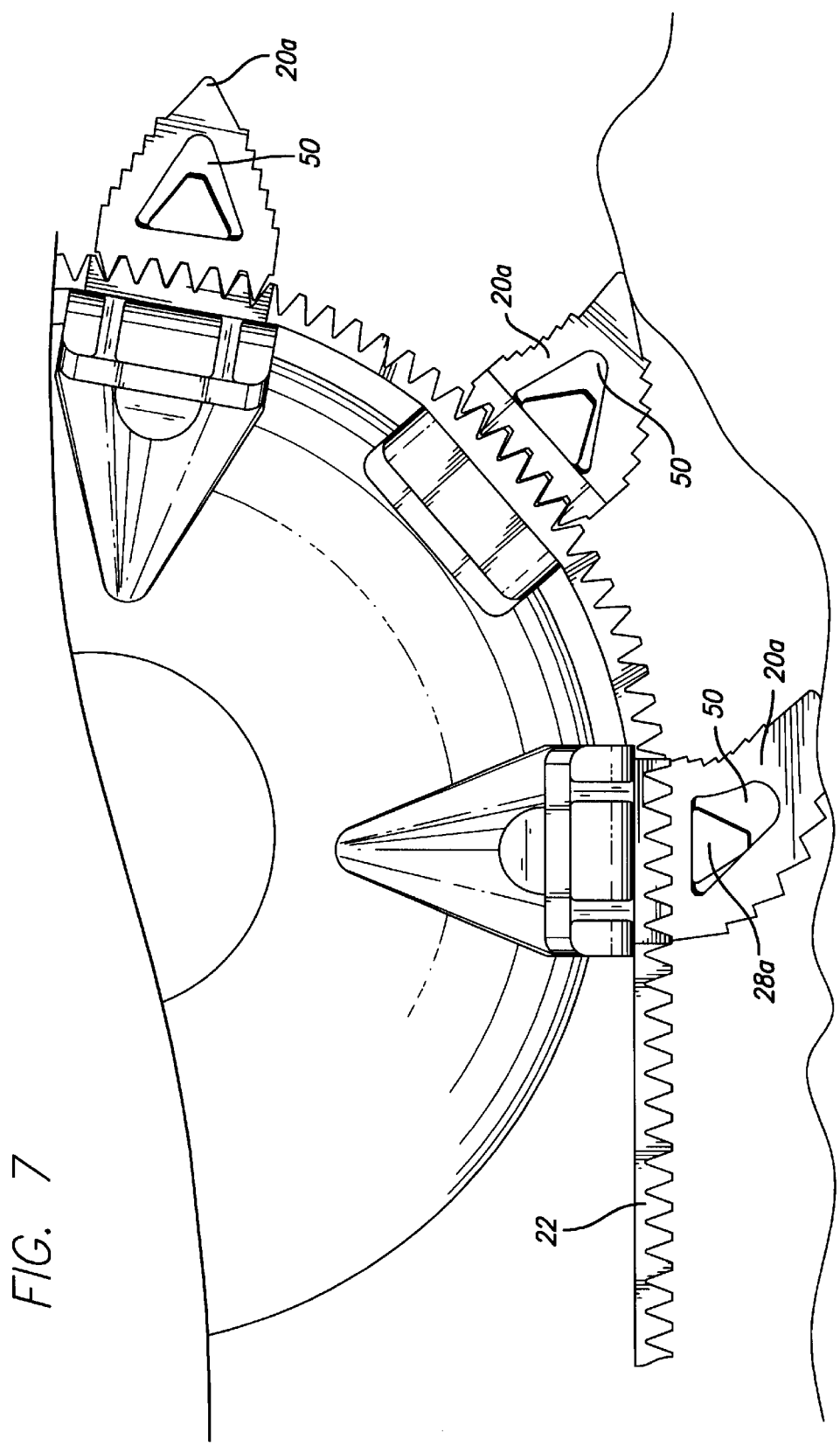
FIG. 7 is an end view of a track belt section having a plurality of rows of the first embodiment of the grouser structure thereon, a first row of grouser structures having no pressure thereon, a second row of grouser structures having some pressure thereon, and a third row of grouser structures having significant pressure thereon.
Figure 8:
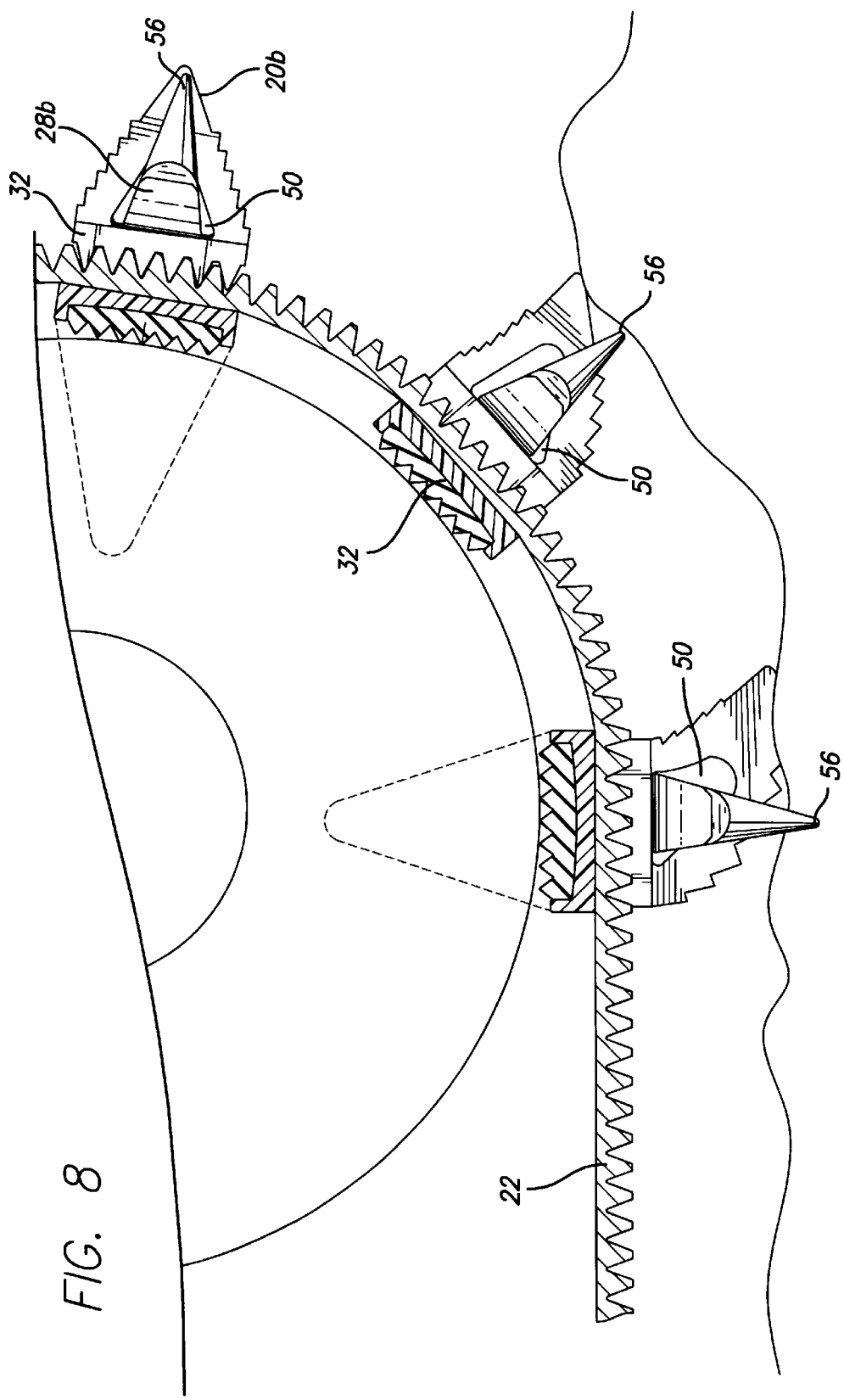
FIG. 8 is a view from the center of the track belt looking towards an exterior edge of the track belt, the track belt section having a plurality of rows of the second embodiment of the grouser structure thereon, a first row of grouser structures having no pressure thereon, a second row of grouser structures having some pressure thereon, and a third row of grouser structures having significant pressure thereon.

Configuration and Use:

As shown in FIGS. 2 and 4 for exemplary purposes, two preferred embodiments of the grouser structures 20a and 20b may be alternated on a track belt 22. In these shown embodiments, one row having a single central grouser structure 20a would be alternated with a plurality of spaced grouser structures 20b. Alternative embodiments could have a plurality of rows of a single grouser structure such as is shown in FIGS. 7 and 8. Additional embodiments of the grouser structures 20 could be combined with or used in the alternative to those shown. It should be noted that these figures are greatly simplified and many elements of the present invention have been omitted. It should also be noted that these figures show a track 22 that surrounds at least two tires. The shown tire is the front tires of the at least two tires and the vehicle is moving forward (to the right).

FIG. 7 shows the track belt 22 having a plurality of rows of the first embodiment of the grouser structure 20a thereon. The grouser structures 20a could be centrally positioned, or spaced, or elongated, or have an alternative structure. As shown in FIG. 7, however, prior to coming into contact with the terrain, a row of grouser structures has no pressure thereon. Then, as it comes into contact with the terrain, a row of grouser structures may bend or flex. Finally, as the weight of the vehicle rolls over a row of grouser structures, it has significant pressure thereon and bends and flexes significantly. However, although the gap 50 between the grouser chamber 38 and the spline element 28a allows some flexing for the purpose of providing shock absorption and better traction, the spline element 28a creates a limiting factor to how far the grouser body 26 can flex.

FIG. 8 is a view from the center of the track belt 22 looking towards an exterior edge of the track belt and having a plurality of rows of the second embodiment of the grouser structure 20b thereon. The grouser structures 20b could be centrally positioned, or spaced, or elongated, or have an alternative structure. As shown in FIG. 8, however, prior to coming into contact with the terrain, a row of grouser structures has no pressure thereon. Then, as a grouser structure comes into contact with the terrain the grouser body may bend or flex. The ice cleat 56, however, remains upright and ready to penetrate the terrain for traction purposes. As the weight of the vehicle rolls over a row of grouser structures, it has significant pressure thereon and bends and flexes significantly. Further, the ice cleat 56 may penetrate the terrain for traction purposes. Although the gap 50 between the grouser chamber 38 and the spline element 28a allows some flexing for the purpose of providing shock absorption and better traction, the spline element 28a creates a limiting factor to how far the grouser body 26 can flex.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A grouser structure for use on an outer surface of a continuous track belt surrounding at least one tire on each side of a vehicle for traction and shock absorbing purposes, said grouser structure comprising:
   (a) a grouser body having an outer body peripheral surface, said grouser body being substantially triangular in cross-section;
   (b) a grouser chamber defined within said grouser body, said grouser chamber having an inner chamber peripheral surface, said grouser chamber being substantially triangular in cross-section; and
   (c) a spline element positioned within said grouser chamber, said spline element having an outer spline peripheral surface, said spline element being substantially triangular in cross section.

2. The grouser structure of claim 1 further comprising a gap formed between said inner chamber peripheral surface and said outer spline peripheral surface.

3. The grouser structure of claim 2 wherein said gap provides shock absorption properties to said grouser structure.

4. The grouser structure of claim 2 wherein said gap allows said grouser body to flex.

5. The grouser structure of claim 2 wherein said gap allows said grouser body to bend.

6. The grouser structure of claim 1, said outer body peripheral surface having gripping structure at least partially thereon.

7. The grouser structure of claim 1, wherein said a grouser body has a first body side leg, a second body side leg, and a body base, wherein:
   (a) a top edge of said first body side leg adjoins a top edge of said second body side leg;
   (b) a bottom edge of said first body side leg adjoins a first edge of said body base; and
   (c) a bottom edge of said second body side leg adjoins a second edge of said body base.

8. The grouser structure of claim 7, wherein said body base has a plurality of alternating grooves and ribs suitable for mating with said track belt.

9. The grouser structure of claim 7 further comprising a at least one fastener, wherein said body base has at least one mounting passage defined therein through which a respective said at least one fastener may be inserted.

10. The grouser structure of claim 7, wherein said body base is substantially solid.

11. The grouser structure of claim 7, wherein said body base is a closed body base.

12. The grouser structure of claim 7, wherein body base includes at least one structure spanning between said bottom edge of said first body side leg and said bottom edge of said second body side leg to prevent spreading therebetween.

13. The grouser structure of claim 1, wherein said grouser body is constructed from a tough and substantially stiff material having at least some give.

14. The grouser structure of claim 1, wherein said grouser body is constructed from wear-resistant material.

15. The grouser structure of claim 1 wherein said spline element is a solid reinforcement spline element.

16. The grouser structure of claim 1, further comprising an extension section associated with said spline element.

17. The grouser structure of claim 1, further comprising an ice cleat, said ice cleat functionally attached to said spline element.

18. A shock absorbing system for use on an outer surface of a continuous track belt surrounding at least one tire on each side of a vehicle for traction and shock absorbing purposes, said track belt having a width, said shock absorbing system comprising:
(a) a plurality of grouser structures having a longitudinal axis, each grouser structure having shock absorbing properties;
(b) a first row having a single grouser structure centrally positioned relative to the width of said track belt, said longitudinal axis parallel to said width of said track belt;
(c) a second row having a pair of spaced grouser structures, each said longitudinal axis of said respective spaced grouser structures parallel to said width of said track belt; and
(d) said first row and said second row being alternated over said outer surface of said continuous track belt.

19. A grouser body for use on an outer surface of a continuous track belt surrounding at least one tire on each side of a vehicle for traction and shock absorbing purposes, said grouser body comprising:
(a) a first body side leg having a top edge and a bottom edge;
(b) a second body side leg having a top edge and a bottom edge;
(c) a body base having a first edge and a second edge;
(d) said top edge of said first body side leg adjoining said top edge of said second body side leg;
(e) said bottom edge of said first body side leg adjoining said first edge of said body base;
(f) said bottom edge of said second body side leg adjoining a second edge of said body base;
(g) said first body side leg, said second body side leg, and said body base substantially forming a triangle;
(h) a grouser chamber defined between said first body side leg, said second body side leg, and said body base, said grouser chamber being substantially triangular in cross-section; and
(i) said body base adapted to be secured to said track belt.

20. The grouser body of claim 19, said a grouser body having an outer body peripheral surface, said outer body peripheral surface at least partially having gripping structure thereon.

21. The grouser body of claim 19, wherein said body base has a plurality of alternating grooves and ribs suitable for mating with said track belt.

22. The grouser body of claim 19, wherein said body base has at least one mounting passage defined therein through which a respective at least one fastener may be inserted.

23. The grouser body of claim 19, wherein said body base is substantially solid.

24. The grouser body of claim 19, wherein said body base is a closed body base.

25. The grouser body of claim 19, wherein body base includes at least one structure spanning between said bottom edge of said first body side leg and said bottom edge of said second body side leg to prevent spreading therebetween.

26. The grouser body of claim 19, wherein said grouser body is constructed from a tough and substantially stiff material having at least some give.

27. The grouser body of claim 19, wherein said grouser body is constructed from wear-resistant material.

28. The grouser body of claim 19, further comprising a spline element positioned within said grouser chamber.

29. The grouser body of claim 28 wherein said spline element is a solid reinforcement spline element.

30. The grouser body of claim 28 further comprising an extension section associated with said spline element.

31. The grouser body of claim 28 further comprising an ice cleat, said ice cleat functionally attached to said spline element.

32. The grouser body of claim 28 further comprising a gap formed between said inner chamber and said spline.

33. The grouser body of claim 32 wherein said gap provides shock absorption properties to said grouser structure.

34. The grouser body of claim 32 wherein said gap allows said grouser body to flex.

35. The grouser body of claim 32 wherein said gap allows said grouser body to bend.

36. A grouser structure comprising:
(a) a grouser body substantially triangular in cross-section, said grouser body comprising:
(i) a first side grouser body leg;
(ii) a second side grouser body leg; and
(iii) a grouser body base;
(b) a spline element substantially triangular in cross-section, said spline element comprising:
(i) a first spline element side;
(ii) a second spline element side; and
(iii) a spline element base;
(c) said spline element disposed at least partially within said grouser body; and
(d) a first gap defined between said first side grouser body leg and said first spline element side, said first gap providing shock-absorbing characteristics.

37. The grouser structure of claim 1 further comprising a second gap defined between said second side grouser body leg and said second spline element side, said second gap providing shock absorbing characteristics.

38. A grouser structure for use on an outer surface of a continuous track belt surrounding at least one tire on each side of a vehicle for traction and shock absorbing purposes, said grouser structure comprising:
(a) a grouser body having an outer body peripheral surface;
(b) a grouser chamber defined within said grouser body, said grouser chamber having an inner chamber peripheral surface;
(c) a spline element positioned within said grouser chamber, said spline element having an outer spline peripheral surface; and
(d) a gap formed between said inner chamber peripheral surface and said outer spline peripheral surface;
(e) wherein said gap provides shock absorption properties to said grouser structure.

* * * * *